United States Patent
Asiri et al.

(10) Patent No.: US 11,963,835 B1
(45) Date of Patent: Apr. 23, 2024

(54) FINGERTIP DENTAL FLOSSER

(71) Applicant: KING FAISAL UNIVERSITY, Al-Ahsa (SA)

(72) Inventors: Faris Yahya I. Asiri, Al-Ahsa (SA); Youseef Majed Almugla, Al-Ahsa (SA); Hatim Dhaifallah Alqurashi, Al-Ahsa (SA); Mohammad Hamidaddin, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/136,869

(22) Filed: Apr. 19, 2023

(51) Int. Cl.
*A61C 15/04* (2006.01)

(52) U.S. Cl.
CPC .................. *A61C 15/046* (2013.01)

(58) Field of Classification Search
CPC ......... A61C 15/00; A61C 15/02; A61C 15/04; A61C 15/041; A61C 15/042; A61C 15/043; A61C 15/045; A61C 15/046; A61C 15/048; A46B 15/00; A46B 15/0055; A46B 15/0069; A46B 15/0071; A46B 15/0073; A46B 2200/108
See application file for complete search history.

(56) References Cited

U.S. PATENT DOCUMENTS

| | | | | |
|---|---|---|---|---|
| 4,727,895 A | * | 3/1988 | Berarducci | A61C 15/046 132/323 |
| 5,287,865 A | * | 2/1994 | Fulton | A61C 15/046 132/325 |
| 5,735,298 A | * | 4/1998 | Mayne | A46B 9/04 132/309 |
| 5,881,745 A | * | 3/1999 | Landis | A61C 15/046 132/325 |
| D605,407 S | * | 12/2009 | Wagner | D4/103 |
| 11,103,053 B2 | * | 8/2021 | Toofer | A46B 5/04 |
| 2003/0088930 A1 | * | 5/2003 | Abada | A46B 5/04 132/308 |

(Continued)

FOREIGN PATENT DOCUMENTS

CN 205358673 U 7/2016

OTHER PUBLICATIONS

"Baby Silicon Finger ToothBrush", Lifekraft, printed from Amazon.com Feb. 24, 2023.

*Primary Examiner* — Cris L. Rodriguez
*Assistant Examiner* — Karim Asqiriba
(74) *Attorney, Agent, or Firm* — Nath, Goldberg & Meyer; Richard C. Litman

(57) ABSTRACT

The fingertip dental flosser includes a tube or cap made of soft silicone adapted for being worn on a user's index fingertip. A U-shaped flosser fork or yoke is attached to the free end of a mounting arm projecting from the silicone finger cap. The proximal end of the mounting arm is pivotally attached to the silicone finger cap by a pivot pin, ball-and-socket, or other pivot joint so that the floss attached to the fork or yoke may extend orthogonal to the silicone finger cap or may be pivoted to extend axially parallel to the silicone finger cap. The mounting of the fingertip dental flosser on the index finger utilizes the remaining agility and sensitivity of the elderly or disabled, permitting better control and grip over finger pressure, since tactile sensation allows the finger to locate the teeth and interproximal surfaces to position the floss for more effective cleaning.

2 Claims, 2 Drawing Sheets

(56) References Cited

U.S. PATENT DOCUMENTS

| | | | |
|---|---|---|---|
| 2005/0268936 A1* | 12/2005 | Major | A61C 15/043 |
| | | | 132/325 |
| 2009/0035048 A1* | 2/2009 | Safieh | A46B 11/002 |
| | | | 401/282 |
| 2011/0132392 A1* | 6/2011 | Crisp | A46B 15/0073 |
| | | | 132/309 |
| 2013/0319456 A1 | 12/2013 | Safieh | |
| 2014/0000646 A1* | 1/2014 | Safieh | A61C 15/046 |
| | | | 132/323 |
| 2016/0255948 A1* | 9/2016 | Capozza | A46B 5/04 |
| 2021/0137659 A1* | 5/2021 | Othman | A61C 15/046 |
| 2021/0369423 A1* | 12/2021 | Schaefer | A46B 15/0055 |

* cited by examiner

FINGERTIP DENTAL FLOSSER

BACKGROUND

1. Field

The disclosure of the present patent application relates to dental accessories, and particularly to a fingertip dental Rosser worn on the index finger and having a carrier and dispenser for using dental floss to clean teeth.

2. Description of the Related Art

Dental floss is a monofilament cord used to remove particles of food or plaque stuck or wedge between adjacent teeth where a toothbrush would be unable to reach them. The cord may be waxed or unwaxed. Typically a user will remove about a ten centimeter length of dental floss from the supply and tie each end to right and left index figures so that the floss is taut and then manipulate between adjacent teeth to loosen particles of food or plaque. Any loosened particles not removed during the flossing process may then be washed away by brushing the teeth. It is often recommended that teeth be flossed at least once per day as a regular part of a dental hygiene program.

However, the elderly and particularly the disabled may be unable to properly grip or manipulate a conventional dental floss. This may be due to lack, of control, or to a decreased ability to rotate the wrist. While manufacturers are constantly introducing variations and improvements in dental flossing instruments, the needs of the elderly and the disabled have largely not been addressed. Thus, a fingertip dental flosser solving the aforementioned problems is desired.

SUMMARY

The fingertip dental flosser includes a tube or cap made of soft silicone adapted for being worn on a user's index fingertip. A U-shaped flosser fork, or yoke is attached to the free end of a mounting arm projecting from the silicone finger cap. The proximal end of the mounting arm is pivotally attached to the silicone finger cap by a pivot pin, ball-and-socket, or other pivot joint so that the floss attached to the fork or yoke may extend orthogonal to the silicone finger cap or may be pivoted to extend axially parallel to the silicone finger cap. The mounting of the fingertip dental flosser permits better control and grip over the finger pressure since tactile sensation allows the finger to locate the teeth and interproximal surfaces to position the floss for more effective cleaning.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fingertip dental flosser includes a tube or cap made of soft silicone adapted for being worn on a user's index, fingertip. A U-shaped flosser fork or yoke is attached to the free end of a mounting arm projecting from the silicone finger cap. The proximal end of the mounting arm is pivotally attached to the silicone finger cap by a pivot pin, ball-and-socket, or other pivot joint so that the floss attached to the fork or yoke may extend orthogonal to the silicone finger cap or may be pivoted to extend axially parallel to the silicone finger cap. The mounting of the fingertip dental flosser on the index finger takes advantage of the remaining agility and sensitivity of the elderly or disabled, permitting better control and grip over the finger pressure since tactile sensation allows the finger to locate the teeth and interproximal surfaces to position the floss for more effective cleaning.

Figure 1:
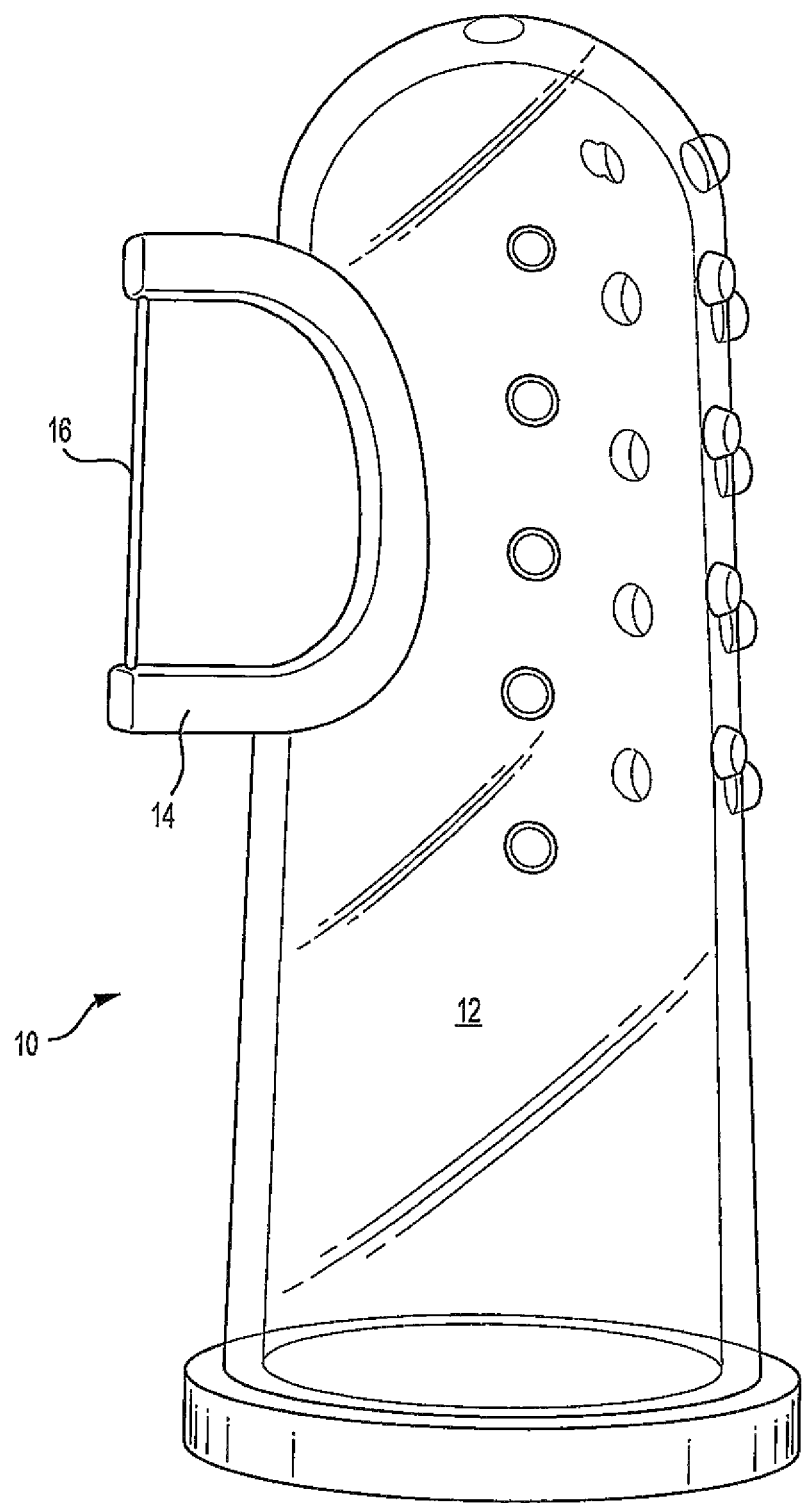
FIG. 1 is an environmental perspective view of a fingertip dental flosser as seen from in front of the device.

Referring to FIG. 1, the fingertip dental flosser 10 includes a tube or cap 12 made of soft silicone adapted for being worn on a user's index fingertip. The material that covers the finger will be 100% food-grade, soft, organic, high elastic silicone material, which is biocompatible, non-toxic, hypoallergenic, and bite-resistant to protect the caregiver's finger and be safe for the patient's teeth in case of accidental bite. A dental flosser fork or yoke 14 projects from the silicone finger cap 12. The dental flosser fork or yoke 14 is adapted for stretching a length of dental floss 16 between the ends of the yoke arms and tying or otherwise securing the floss 16 to the fork or yoke 14.

Figure 2:
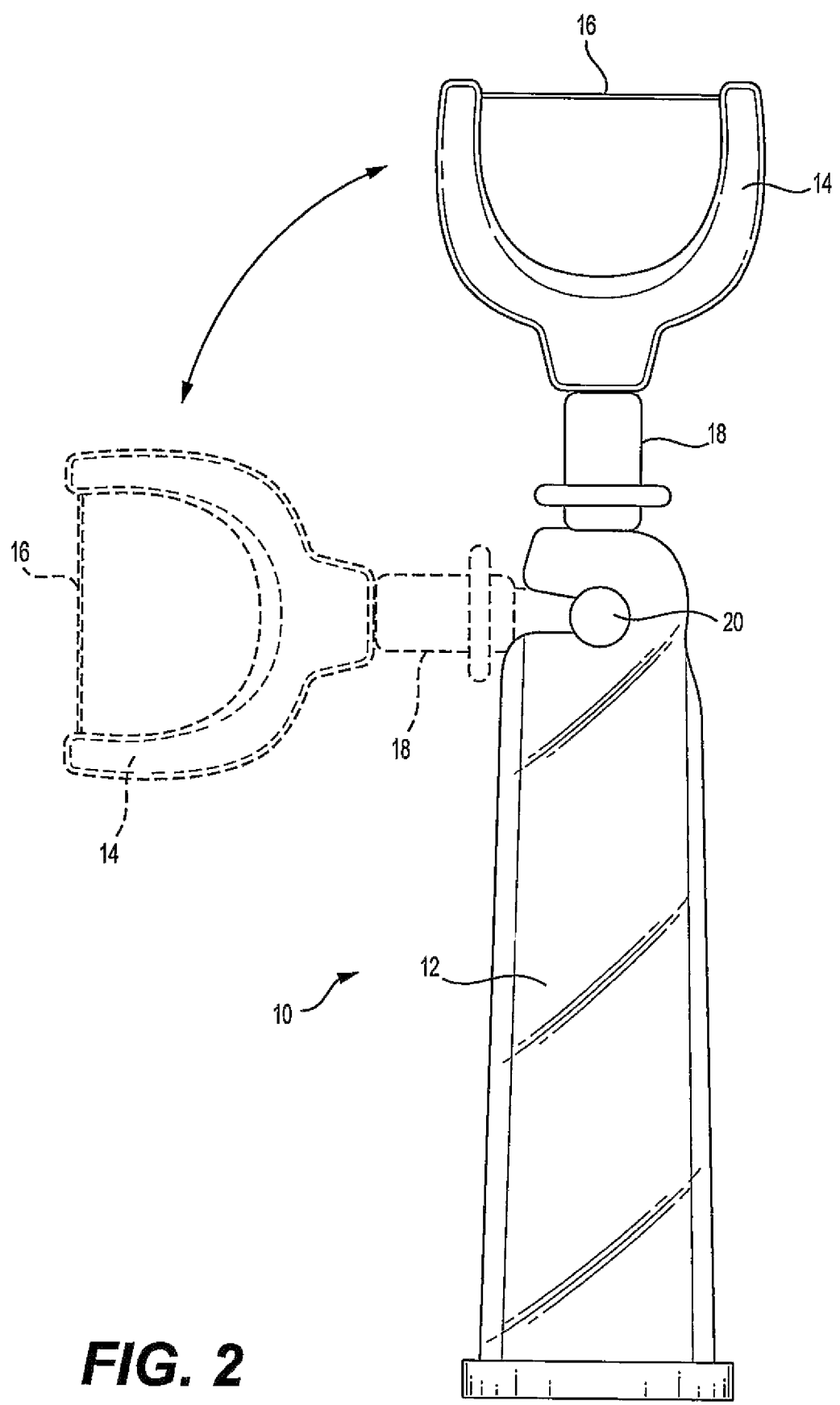
FIG. 2 is side view of the fingertip dental flosser showing the dental floss carrier pivotal between two operating positions.

As shown more clearly in FIG. 2, the dental flosser fork or yoke 14 is mounted on the free end of a mounting arm 18. The proximal end of the mounting arm 18 is pivotally attached to the silicone finger cap 12 by a pivot pin, ball-and-socket, or other pivot joint 20 so that the floss 16 attached to the fork or yoke 14 may extend orthogonal to the silicone finger cap 12 (as shown in solid lines in FIG. 2) or may be pivoted to extend axially parallel to the silicone finger cap 12 (as shown in phantom in FIG. 2). It should be noted that the orientation extending axially parallel to the silicone finger cap 12 makes it easier to floss the anterior teeth, while the orientation orthogonal to the silicone finger cap 12 makes it easier to floss the posterior teeth.

It is to be understood that the fingertip dental Rosser is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A fingertip dental flosser, comprising:
 a soft silicone finger cap dimensioned and configured for being worn on a user's index finger;
 a U-shaped dental flosser yoke extending from the soft silicone finger cap, the U-shaped dental flosser yoke having opposing arms adapted for attaching a length of dental floss between the opposing arms, wherein said length of dental floss is positioned axially parallel to the soft silicone finger cap;
 a mounting arm extending from the soft silicone finger cap, the mounting arm having a free end and a proximal end, the U-shaped dental flosser yoke being mounted on the free end of the mounting arm; and
 a pivot joint attached to the soft silicone finger cap, the proximal end of the mounting arm being attached to the pivot joint so that the mounting arm is pivotally attached to the soft silicone finger cap;
 whereby the user flosses his teeth by manipulating his index finger to position the dental floss.

2. The fingertip dental flosser according to claim 1, wherein said mounting arm is pivotal between a first position in which the length of dental floss extending between the opposed arms of the U-shaped dental flosser yoke is axially parallel to the soft silicone finger cap and a second position in which the length of dental floss extending between the opposed arms of the U-shaped dental flosser yoke is orthogonal to the soft silicone finger cap.

\* \* \* \* \*